United States Patent [19]
Vissers

[11] Patent Number: 6,104,702
[45] Date of Patent: Aug. 15, 2000

[54] APPARATUS AND METHOD FOR EXTENDING OPERATION OF NON-INTRUSIVE MONITORS IN SDH

[75] Inventor: Maarten P. Vissers, Huizen, Netherlands

[73] Assignee: Lucent Technologies Inc., Murray Hill, N.J.

[21] Appl. No.: 09/036,455

[22] Filed: Mar. 6, 1998

[51] Int. Cl.[7] .............................. G01R 31/08; H04J 3/02
[52] U.S. Cl. ......................... 370/241; 370/248; 370/251; 370/541
[58] Field of Search .................................... 370/241, 242, 370/244, 245, 248, 250, 252, 541, 539

[56] References Cited

U.S. PATENT DOCUMENTS 5,432,796  7/1995  Borschel et al. ...................... 371/25.1
5,706,280  1/1998  Kosugi et al. .......................... 370/244
5,822,299  10/1998  Goodman ............................... 370/228
5,841,762  11/1998  Hershey ................................. 370/252

*Primary Examiner*—Ajit Patel
*Assistant Examiner*—Hanh Nguyen

[57] ABSTRACT

A method and apparatus for monitoring signals communicated over a signal path from a source to a destination with the signals containing a set of data representing a data signal type comprises a first device for accessing a first portion of the data set from the received signal and generating a first indication signal relating to a status of the received signal; a second device for accessing a second portion of the data set from the received signal and generating a second indication signal relating to a further status of the received signal; and, a device for generating a composite signal representing a combination of the first and second indication signals for indicating a specific status of the received signal. The types of signals include normal VC-n signals, unequipped VC-n signals and supervisory-unequipped VC-n signals communicated in an SDH/SONET network, the composite signal capable of uniquely identifying receipt of unequipped VC-n signals over a signal path in the network.

17 Claims, 2 Drawing Sheets

Page 1

APPARATUS AND METHOD FOR EXTENDING OPERATION OF NON-INTRUSIVE MONITORS IN SDH

FIELD OF THE INVENTION

The instant invention relates generally to telecommunication networks generally, and specifically, to an apparatus and method for extending operation of non-intrusive monitors ("NIM") implemented in telecommunications networks for monitoring virtual container ("VC") signals.

BACKGROUND OF THE INVENTION

The Synchronous Digital Hierarchy ("SDH") protocol provides a set of signals and procedures defined by ITU-T for governing and supporting telecommunications network management ("TMN") functions. The types of transmission signals and frame structures implemented in SDH is documented in ITU-T Recommendation G.707, the contents and disclosure of which is incorporated by reference as if fully set forth herein. (In the USA th e same set of signals is called "SONET"). Pursuant to ITU-T, one broad TMN function is Performance Management which, inter alia, provides for performance monitoring of telecommunications network components.

Generally, SDH signals comprise a nested set of frame structures with an outer frame structure including the Synchronous Transport Module ("STM-n") frame structure and within the STM-n frame, higher order virtual container "VC-n" frame structures can be present. A VC frame consists of a block of overhead and a payload block. The overhead is added to monitor the transmission performance through the network. Additionally, within a higher order VC frame, lower order VC frame structures can be present. For instance, according to the current SDH standards, there are five VC frame structures: VC-11, VC-12, VC-2, VC-3, VC-4 with VC-3 and VC-4 comprising the higher order VCs and VC-11, VC-12, VC-2 and VC-3 comprising the lower order VCs. It should be understood that a normal VC signal is a VC that contains a client signal in its payload. The VC overhead block contains so called "path trace bytes" which are used to transport an Access Point Identifier (API), which is unique in the network and identifies the source of the path.

In accordance with the ITU-T standards, an unequipped VC ("U-VC-n") is defined as a VC signal of which the path signal label, the path trace identifier and the network operator bytes/bits are all O's, the bit interleaved parity is valid, and the remainder of the VC signal is unspecified and indicates that there is no end-to-end path through the network. The path trace byte is thus set to all-0's in an unequipped VC signal. Typically, the unequipped VC signal is inserted by a switch fabric in the absence of a matrix connection (i.e., input signal). It is recognized by the presence of all-0's in the signal label (in the VC overhead). A supervisory-unequipped VC ("SU-VC-n") is a test signal containing the VC overhead and an undefined payload. It is used to test a connection which is allocated, e.g., to indicate that other applications may exist for this SU-VC-n signal, as a standby connection in the case that one of the active connections in the network fails, and the transport service has to be quickly restored. It is understood that the normal VC and supervisory-unequipped VC signals have path trace bytes carrying the APIs (not all-0's), however, the signal label of the supervisory-unequipped VC signal is also defined as containing the all-0's pattern, i.e. it contains the same signal label pattern as the unequipped VC signal label pattern. This provides a problem for the monitoring equipment as will be explained.

As shown in FIG. 1, a signal path 10 in a telecommunications system comprises a source terminal equipment 20a and a sink terminal equipment 20b and intermediate equipment indicated as elements 25a, 25b, . . . , 25n. A VC-n signal originates at the source terminal equipment 20a and ends at sink equipment 20b where the VC overhead of the passed through VC-n signal is removed and the payload signal is extracted and forwarded. Non-intrusive monitors (NIMs), such as NIM 100 shown in FIG. 1, are provided for monitoring the quality of the VC-n signals as they are transported throughout the network path. NIMs perform a non-intrusive "listen-only" function and can be located at any point in the network path, e.g., in intermediate equipment, through which the VC-n signals pass. Presently, the NIM is able to monitor normal VC-4, VC-3, VC-2, VC-12 and VC-11 signals at any intermediate point in a path. The specifications for all equipment handling SDH VC-n signals are governed by ITU-T Recommendation G.783 and ETS 300 417, the contents and disclosure of which is incorporated by reference as if fully set forth herein.

As NIMs function similarly to path terminations, they behave similarly to the reception of supervisory-unequipped VC signals as VC-n path terminations do. Thus, if a supervisory-unequipped VC-n signal is received by a NIM that conforms with standard, then the existing NIM detects what is commonly referred to as an UNEQ defect ("dUNEQ") which is the detection of a VC signal loss condition. A receipt of a dUNEQ signal means that somewhere in the path between the termination source and sink points, a switch fabric removed the matrix connection, resulting in the switch fabric not being able to pass the incoming VC signal causing the generation of the unequipped VC signal output (See e.g. ETS 300-417-4-1, S4m_TT_Sk function, or G.783 Snm_TT_Sk function). NIMs were defined in this way so that a VC-n test signal would not require a change in the existing path termination and non-intrusive monitor functions, in the absence of an application validating such change.

FIG. 2 illustrates a block diagram of a VC-n Layer NIM monitor 100 implementing, e.g., an Snm_TT_Sk function. As shown in FIG. 2, the existing (normal) VC-NIM 100 includes a dUNEQ detection block 30 which generates a defect signal called "dUNEQ" that is input to the normal "defect correlation" process block 40 and "consequent action" process block 50 at the detection of a signal loss condition, i.e., when the signal label of the received VC-n signal contains the all-0's signal pattern.

The defect correlation process block 40 has multiple input signals amongst others the dUNEQ signal. The process determines, for the case multiple input signals are active, the highest priority defect condition, and output that as the (most probable) "fault cause."

The consequent action process block 50 has multiple input signals, amongst others the dUNEQ signal. The process determines which consequent action should be initiated on activation of an input signal. In general, consequent actions are:

the insertion of the Alarm Indication Signal (AIS) in the downstream direction of transmission to prevent that downstream of this point alarms are being raised;

the insertion of a remote defect indication (RDI) signal in the upstream direction to inform die source of the failed signal that the signal failed;

the insertion of a remote defect indication (RDI) signal in the upstream direction to inform the source of the failed signal that that signal failed;

the generation of a signal fail (SF) indication to indicate, e.g., protection switching restoring the end-to-end transport;

the generation of a signal degrade (SD) indication to initiate, e.g., protection switching restoring the end-to-end transport, etc.

A path termination function is required to support al the mentioned consequent actions. A non-intrusive monitor is not allowed to insert AIS, RDI.

The Trace Id acceptance block 35 is provided to detect the path trace bytes of the received VC-n signal and generate an AcTI signal used later for forwarding of the VC-n signal. The Trade Id acceptance block 35 extracts the path trace bytes from the received VC signal and performs a persistency check on those. If the trace identifier pattern which is extracted is persistent, this pattern becomes the Accepted Trace Identifier (AcTI) signal. The AcTI signal is reported on request of a management system. The management system or the user of this system can then use this information as input for a fault localization action, or as input for a path setup action.

Currently, it is the case that an NIM for a normal VC-n signal detects a signal loss condition upon receipt of a supervisory-unequipped SU-VC signal as well as unequipped VC-n signal due to the all-0's signal label pattern. To rectify this situation, the Q.9/15 standard committee proposed the addition of a dedicated supervisory-unequipped VC-n NIM (SU-NIM) to the G.783 standard as an additional way of monitoring non-intrusively supervisory-unequipped VC signals. This is a consequence of the extension of the application for the supervisory-unequipped VC signal. Thus, a dedicated supervisory-unequipped VC NIM does not detect a signal loss condition when it receives a supervisory-unequipped VC signal.

The definition of the SU-NIM implies that operators would require both NIM as well as SU-NIM to be present in equipments. The operator must now provision a priori which of the two NIM types to activate; either the (normal) NIM or the SU-NIM.

If the operator selected the NIM and a SU-VC-n is actually received (by mistake), a signal loss condition is reported. If instead, the SU-NIM was activated, a connection mismatch condition would have been reported. If the operator would have selected a SU-NIM (instead of a normal NIM), VC-n signal loss condition reporting depends on the provisioning status of connection mismatch condition detection (this is an option controlled by the operator). With connection mismatch, condition detection disabled, the SU-NIM will not be able to detect the signal loss condition, whereas the normal NIM will detect it.

The type of non-intrusive monitor which must be active has to be defined in conjunction with the expected VC signal (normal-VC or test-VC). It must be changed if the expected signal is changed.

The complication for the equipment design is, thus, that two types of NIM processing are to be included, and the actual active NIM type is selectable by the operator.

The complication for the operator using the equipment is, thus, that he/she has to select one of the two NIM types to be active, and that a reselection is required if the VC signal type changes.

The invention merges the behavior of both NIM types, such that a manufacturer needs to implement a single type only, and that an operator doesn't have to select and/or reselect the NIM type depending on the VC signal type which is expected to pass through.

It would thus be desirable to eliminate the need to reprovision the NIM type (normal NIM, SU-NIM) when the normal VC-n signal on the connection is replaced by the supervisory-unequipped VC-n signal.

SUMMARY OF THE INVENTION

The invention relates to an apparatus and methodology for extending operations of NIM equipment to handle all VC type signals (normal, unequipped, supervisory-unequipped) without provisioning. Specifically, a "super-NIM" is created which comprises a modification of the processing structure of a normal VC-n NIM by replacing "dUNEQ" term in the defect correlation and consequent action processes for the VC-n NIM, by the term "dUNEQ and AcTI="all 0's". Additionally, in accordance with the invention, "path trace bytes" indicating a path trace identifier mismatch condition in the SU-VC-n signal, are utilized in the NIM of the invention to differentiate between unequipped and supervisory-unequipped VC signals. Advantageously, the invention eliminates the need to reprovision the NIM type (normal NIM, SU-NIM) when the normal VC-n signal on the connection is replaced by the supervisory-unequipped VC-n signal. It also eliminates the need to create one more object type in the information model, thereby simplifying the management of such equipment.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

Figure 1:
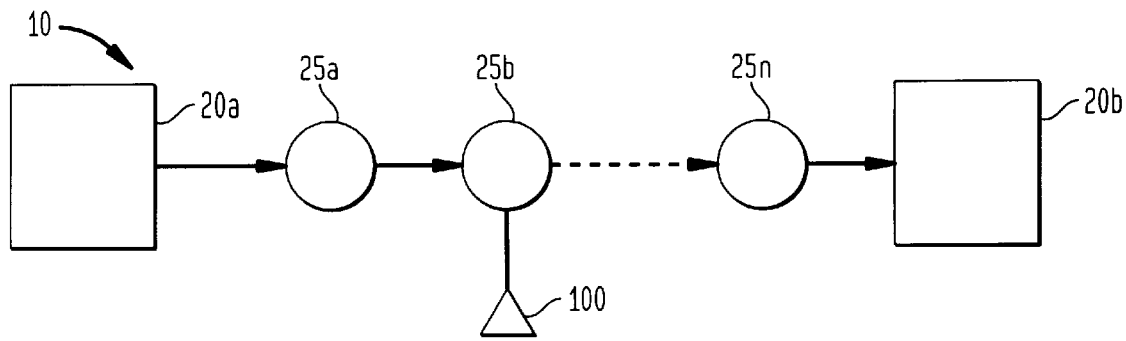
FIG. 1 illustrates a signal path for a VC-n signals in a telecommunications system.
Figure 2:
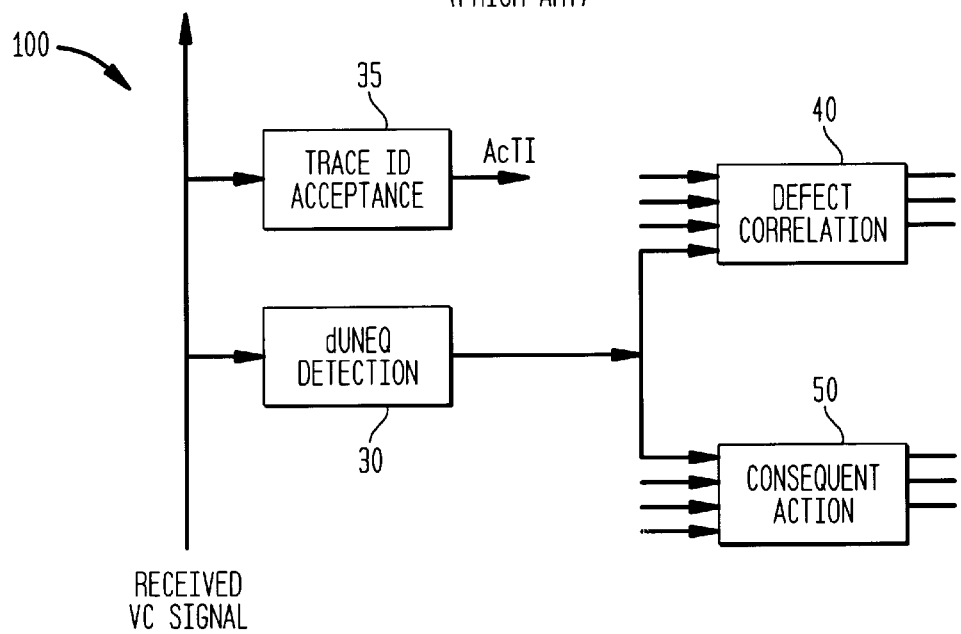
FIG. 2 illustrates a prior art embodiment of an example VC-n NIM 100 implementing a Snm_TT_Sk function.
Figure 3:
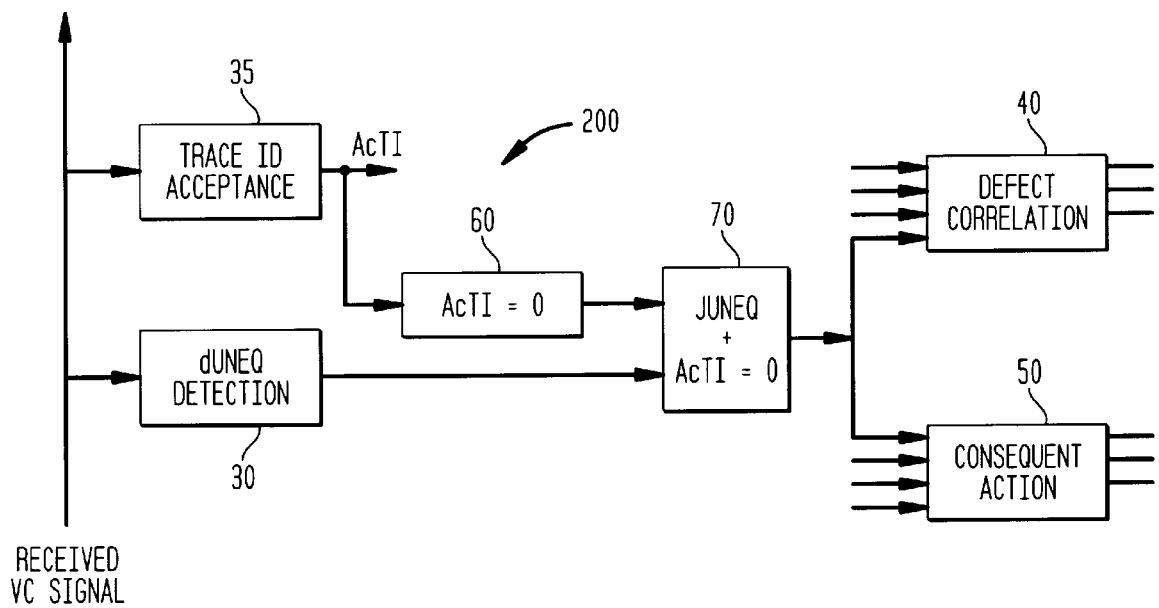
FIG. 3 illustrates the "super" NIM 200 containing the improvements for properly distinguishing between receipt of normal VC signal loss condition and a SU-VC-n signal condition.

FIG. 3 illustrates the "super" NIM 200 of the invention which is a modification of the VC-n layer NIM 100 (FIG. 2) and incorporates two new functional blocks: 1) the extended signal pattern AcTI="all-0's" generation block 60; and, 2) the dUNEQ and AcTI=0 processing block 70, where the term "and" refers to the boolean "and" function. In the modified NIM 200, when the defect signal "dUNEQ" (FIG. 2) is replaced by a signal "dUNEQ and AcTI="all-0's", as generated by the dUNEQ and AcTI=O processing block 70 shown in FIG. 3, then the modified VC-NIM will be able to handle SU-VC signals like normal VC signals. It will not longer declare that the SU-VC is an unequipped VC (U-VC).

The block AcTI=all-O's represents a comparison process which compares the content of the input signal AcTI with the all-O's pattern. For the case the AcTI signal contains the all-O's pattern, the output signal of the block becomes "true" (boolean). Otherwise, output signal is "false."

The dUNEQ variable is also a boolean variable with states "true" and "false." The block "dUNEQ and AcTI=O" represents the logical (boolean) "and" process between the input signals "dUNEQ" and "AcTI=O." As such, there is no multiplexing device. The additional processing can be realized in hardware or software.

As shown in FIG. 3, the signal "AcTI" represents the value of the received and accepted trace identifier (path trace bytes). If this AcTI value is all-0's, there is a U-VC signal received if dUNEQ is detected. If, on the other hand, AcTI is not equal to all-0's while dUNEQ is detected, then the NIM 200 assumes that a SU-VC signal is received. Thus, the value of AcTI validates the unequipped defect (dUNEQ) detection.

The table below shows the status of the signals "dUNEQ" and "AcTI=O" for the three VC signal types:

| VC signal | dUNEQ | AcTI = O |
|-----------|-------|----------|
| normal-VC | false | false    |
| SU-VC     | true  | false    |
| U-VC      | true  | true     |

Normal-VC and SU-VC are differentiated by the status of "dUNEQ", and SU-VC and U-VC are differentiated by the status of "AcTI=O".

Specifically, the parameter AcTI=all "0"s represents the detection of all "0"s in the path trace byte (J1/J2) of the VC-n signal. With the enhancement provided in the NIM 200 of the invention, the signature of the unequipped VC-n signal is extended from all "0"s in the signal label, into all "0"s in the signal label and the path trace byte. The supervisory-unequipped VC-n signal will thus no longer be detected as an unequipped VC-n signal.

However, the modification of the consequent action may cause the declaration of TSF (Trail Signal Fail) on an unequipped defect condition to be delayed by at maximum 100 ms which delay is minimal having no deleterious effect on the SDH operations.

The foregoing merely illustrates the principles of the present invention. Those skilled in the art will be able to devise various modifications, which although not explicitly described or shown herein, embody the principles of the invention and are thus within its spirit and scope.

What is claimed is:

1. An apparatus for monitoring the status of signals communicated over a signal path from a source to a destination, each of said signals containing a set of data representing a data signal type, said apparatus comprising:

first means for accessing a first portion of said data set from said received signal and generating a first indication signal relating to a status of said received signal, said first indication signal being dUNEQ;

second means for accessing a second portion of said data set from said received signal and generating a second indication signal relating to a further status of said received signal, said second indication signal indicating that an AcTI signal associated with said received signal contains all 0's; and, means for generating a composite signal representing a combination of said first and second indication signals, said composite signal indicating a specific status of said received signal.

2. An apparatus for monitoring as claimed in claim 1, wherein said data signal type is one of a normal VC-n signal, an unequipped VC-n signal and a supervisory-unequipped VC-n signal, where n is a frame layer for a VC signal communicated in a SDH/SONET network, said first indication signal representing status of both said unequipped VC-n signal and supervisory-unequipped VC-n signals.

3. An apparatus for monitoring as claimed in claim 1, wherein said first indication signal represents a VC-n signal loss condition.

4. An apparatus for monitoring as claimed in claim 2, wherein said second indication signal contains data representing a source location for said signal path, said second indication signal being uniquely defined upon receipt of an unequipped VC-n signal.

5. An apparatus for monitoring as claimed in claim 2, wherein said composite signal uniquely distinguishes between a received unequipped VC-n signal and a said supervisory-unequipped VC-n signal.

6. An apparatus for monitoring as claimed in claim 2, wherein said means for generating a composite signal includes a boolean/logical "and" process.

7. In an apparatus for monitoring a status of signals from among a plurality of signals capable of being communicated in an SDH/SONET network path, each said signal containing data representing a unique network condition, the apparatus, upon receipt of a signal, providing a first signal indicating one condition of said network regardless of the data set of the received signal, and capable of providing a second signal indicating a source of said signals in said network, the provision of a means for generating a composite signal representing a combination of said first and second indicating signals, said composite signal being able to identify said unique network condition.

8. An apparatus for monitoring a status of signals from among a plurality of signal types as claimed in claim 7, wherein said plurality of signal types includes a normal VC-n signal, an unequipped VC-n signal and a supervisory-unequipped VC-n signal, where n is a frame layer for a VC signal communicated in an SDH/SONET network, said first signal indicating a VC-n signal loss condition upon receipt of either an unequipped VC-n signal and a supervisory-unequipped VC-n signal.

9. A method for determining type of a VC-n signal in an SDH/SONET network, said method comprising the steps of:
   receiving the VC-n signal;
   generating a dUNEQ signal corresponding to the VC-n signal;
   generating an AcTI signal indicative of whether all "0"s are present in a path trace byte of the VC-n signal; and
   reporting the VC-n signal as unequipped VC-n signal if the generated dUNEQ signal is true and the generated AcTI signal indicates all "0"s in the path trace bytes of the VC-n signal.

10. A method for determining type of a VC-n signal in an SDH/SONET network according to claim 9, said method further comprising the step of reporting the VC-n signal as supervisory unequipped VC-n signal if the generated dUNEQ signal is true and the generated AcTI signal does not indicate all "0"s in the path trace bytes of the VC-n signal.

11. A method for determining type of a VC-n signal in an SDH/SONET network according to claim 10, said method further comprising the step of reporting the VC-n signal as normal VC-n signal if the generated dUNEQ signal is false and the generated AcTI signal does not indicate all "0"s in the path trace byte of the VC-n signal.

12. A method for determining type of a VC-n signal in an SDH/SONET network according to claim 9, said method further comprising the step of reporting the VC-n signal as normal VC-n signal if the generated dUNEQ signal is false and the generated AcTI signal does not indicate all "0"s in the path trace byte of the VC-n signal.

13. Apparatus for non-intrusive monitoring of a VC-n signal in an SDH/SONET network, said apparatus comprising:

a non-intrusive receiver for receiving the VC-n signal;

means for generating a dUNEQ signal corresponding to the received VC-n signal;

means for generating an AcTI signal corresponding to the received VC-n signal, the generated AcTI signal being indicative of presence of all "0"s in path trace bytes of the VC-n signal; and means for creating a composite signal from the dUNEQ signal and the AcTI signal, the composite signal indicating type of the VC-n signal.

14. Apparatus for non-intrusive monitoring of a VC-n signal in an SDH/SONET network according to claim 13, wherein the composite signal indicates that the received VC-n signal is of the unequipped VC-n signal type if the generated dUNEQ signal is true and the generated AcTI signal indicates all "0"s in the path trace bytes of the VC-n signal.

15. Apparatus for non-intrusive monitoring of a VC-n signal in an SDH/SONET network according to claim 14, wherein the composite signal indicates that the received VC-n signal is of the supervisory unequipped VC-n signal type if the generated dUNEQ signal is true and the generated AcTI signal does not indicate all "0"s in the path trace byte of the VC-n signal.

16. Apparatus for non-intrusive monitoring of a VC-n signal in an SDH/SONET network according to claim 15, further comprising:

a defect correlation process block for determining a highest priority defect condition; and a consequent action process block for determining an appropriate action to be initiated upon detection of a defect condition;

wherein the composite signal is input to the defect correlation process block and the consequent action process block.

17. An apparatus for monitoring the status of signals communicated over a signal path from a source to a destination, each of said signals containing a set of data representing a data signal type, said apparatus comprising:

first means for accessing a first portion of said data set from said received signal and generating a first indication signal relating to a status of said received signal, said first indication signal representing a VC-n signal loss condition;

second means for accessing a second portion of said data set from said received signal and generating a second indication signal relating to a further status of said received signal, said second indication signal containing data representing a source location for said signal path, said second indication signal being uniquely defined upon receipt of an unequipped VC-n signal; and, means for generating a composite signal representing a combination of said first and second indication signals, said composite signal indicating a specific status of said received signal.

* * * * *